May 1, 1951         F. T. NEWELL         2,551,040
WHEELED ATTACHMENT FOR TRANSPORTING BOATS
Filed Dec. 6, 1946                              2 Sheets—Sheet 1
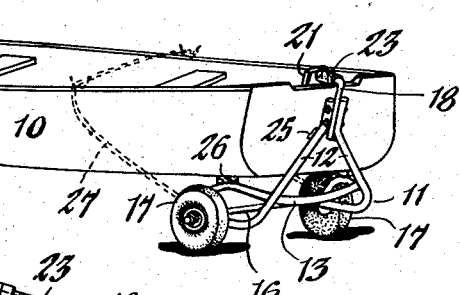
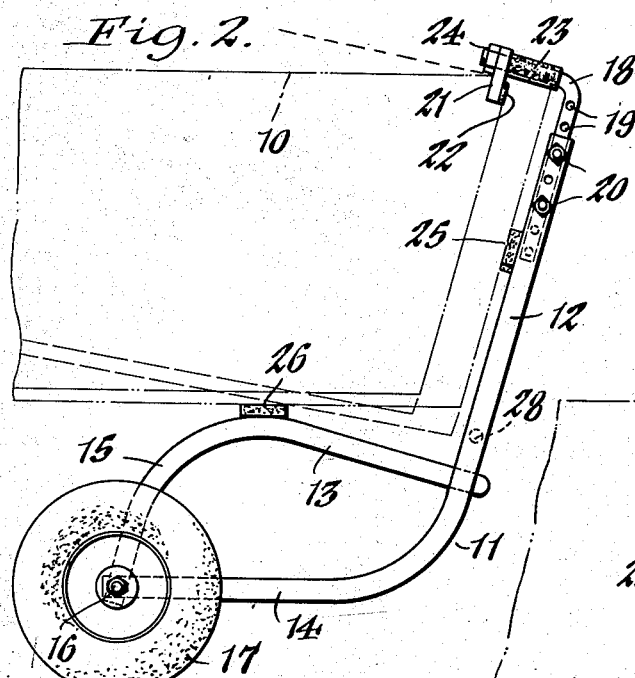
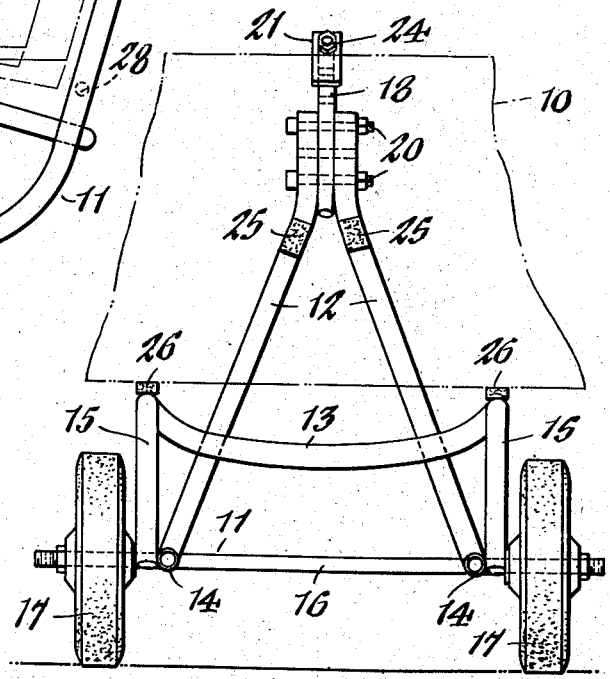
INVENTOR,
Frederick T. Newell,
BY Walter P. Guyer
ATTORNEY.

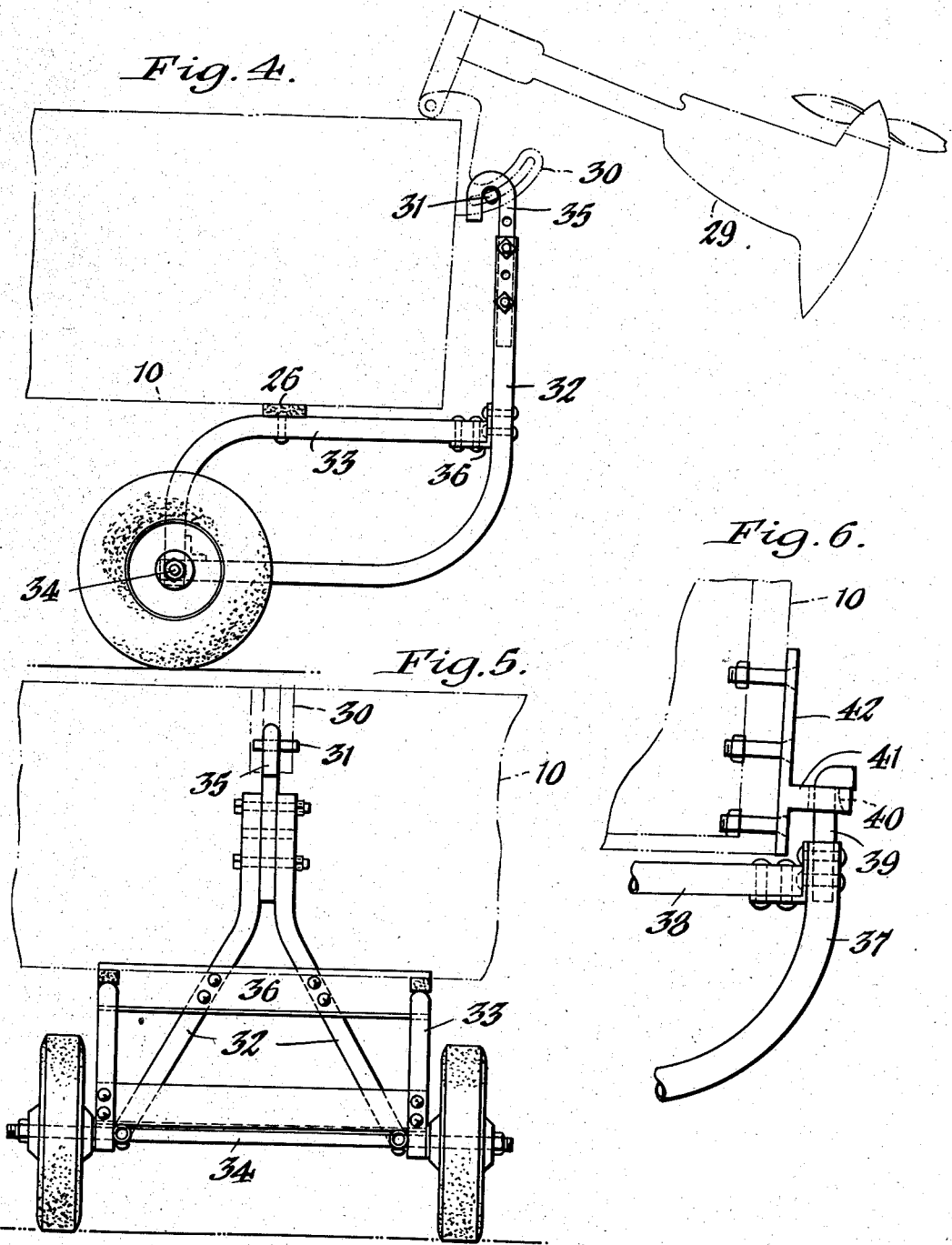

Patented May 1, 1951

2,551,040

UNITED STATES PATENT OFFICE 2,551,040

WHEELED ATTACHMENT FOR TRANSPORTING BOATS

Frederick T. Newell, Bradford, Pa.

Application December 6, 1946, Serial No. 714,522

1 Claim. (Cl. 280—61)

This invention relates generally to improvements in boat handling devices but more particularly to a cart or carrier for shuttling a boat from one location to another, as from a car or boat house to a body of water.

It has for one of its objects to provide a boat shuttle cart which is so designed and constructed as to enable a boat to be detachably supported thereon and conveniently moved by one man with comparative ease and safety from one place to another.

Another object of the invention is to provide a boat handling device of this character which is simple, compact, inexpensive and rugged in construction, which is light in weight, and which is readily adjustable to adapt it to boats of different dimensions and shapes.

A still further object is the provision of a unitary assembly cart which is designed to engage the boat bottom and the transom back to effectually support and retain the boat thereon.

Other features of the invention reside in the construction and arrangement of parts hereinafter described and particularly pointed out in the appended claim.

In the accompanying drawings:

Figure 1 is a perspective view of the shuttle cart showing a boat supported thereon ready to be manually pulled where desired. Figure 2 is an enlarged side elevation of the cart. Figure 3 is a front view of the same. Figure 4 is a side elevation of a modified form of the cart designed for use with outboard motor equipped boats. Figure 5 is a front view thereof. Figure 6 is a fragmentary side view of another modification for use with a bracket attached to the boat.

Similar characters of reference indicate the corresponding parts throughout the several views.

Referring now to the drawings, and particularly to Figures 1–3 inclusive of the drawings showing the preferred embodiment of my invention, 10 indicates a boat of the type which the invention has been designed to handle, and 11 indicates generally the shuttle cart, which is substantially L-shaped in side elevation, and which is adapted to support and retain the rear or stern end of the boat thereto while the front or bow end is adapted to be grasped in the manner shown in Figure 1 and manually pushed or pulled from a garage or storage place to the water or vice versa, as well as for portages in moving from lake to lake on a fishing trip.

This shuttle cart is adapted to detachably engage the rear portion of the bottom and rear or transom back of the boat and to this end consists of a unitary frame including a substantially L-shaped upright rear section 12 adapted to extend along the transom back of the boat in the manner shown in Figure 2 and a substantially U-shaped horizontal bottom section 13, such sections being in opposed intersecting relationship with each other in the manner shown and being welded or otherwise fastened to each other to form a unitary assembly. The back section terminates at its lower end in a forwardly-facing extension 14 while the companion bottom section terminates at its front end in a downwardly-facing extension 15, both extensions serving as a support or journal for an axle 16 on which the wheels 17 are mounted. These frame-sections may be made of tubular or like material and the rear section 12, which is composed of two members disposed in spaced side by side relation with the upright portions converging upwardly, as shown in Figures 1 and 3, is provided at its upper end with a hook-like member 18 adapted to hook over the top of the transom. This hook-like member is adjustable vertically to accommodate for different transom-heights and for this purpose has a row of holes 19 therein for receiving bolts 20 or like fasteners to secure it in place at the upper end of the frame section 12. An adjustable threaded clamping plate 21 and rubber mountings 22 and 23 are associated with the hook-like member 18 for effectually retaining it in place at the top edge of the transom and for cushioning the same as well as to prevent marring of the boat. A nut 24 serves to retain the clamping plate in its operative position and by this construction the cart-frame is adapted to boat-transoms of different thicknesses and angles.

Rubber or like cushioned mountings 25, 26 are applied as shown in Figures 2 and 3 to the back and bottom frame-sections 12 and 13, respectively, for bearing contact with the companion contiguous portions of the boat and serve to cushion and prevent marring of the boat. The mounting 26 is set to accommodate various transom angles as depicted by dotted lines in Figure 2. If desired, a rope 27 may be attached to the axle of the cart, passed around the girth or gunwales of the boat and slipped through the oar-locks to aid in securing the boat to the cart, particularly when pulling the boat forwardly.

If desired, the frame-section 12 may be pivoted, as indicated at 28, whereby the cart may be compactly folded when not in use and conveniently stored in the boat.

In the modified form of the invention shown in Figures 4 and 5, the cart is designed for use with outboard motor-equipped boat, wherein 29 indicates the motor and 30 the customary bracket to which the motor is pivoted for movement into and out of the water. This bracket carries an adjustment pin 31 which normally serves to properly adjust the motor in its operative position on the boat and which pin is utilized, in my invention, as a means for connecting the shuttle cart thereto. To this end, the cart consists of rear and bottom boat-engaging sections 32, 33 which carry the wheel-axle 34, the rear or transom-adjoining section 32 having a vertically adjustable hook 35 at its upper end for detachable engagement with the bracket-pin 31. In this form of the invention the frame-sections are jointed by a transverse tie bar or angle 36.

Referring now to the modification shown in Figure 6, the cart is generally of the same form as that shown in Figures 4 and 5, including the frame-sections 37 and 38, the upright portion of the frame-section 37, however, being short and terminating at substantially the bottom of the boat. Fitted in this frame-portion and rising therefrom is an outwardly facing hook-post 39 which is adapted for detachable engagement with an opening 40 formed in the lug 41 of a bracket 42 permanently attached to the transom or back of the boat.

While manifestly simple, compact and inexpensive in construction, this boat shuttle cart is easy to apply to and remove from the boat and it affords an efficient means for transporting a boat by one man from one location to another and in so doing requires but a minimum of effort.

I claim as my invention:

A boat shuttle cart, comprising a wheeled frame composed of an L-shaped section consisting of two members arranged in spaced side by side relation with the upright portions thereof converging upwardly and adapted to extend along the transom back of the boat and a horizontally disposed U-shaped section secured intermediate the ends of its bight portion to the diverging lower ends of the companion upright portions of the L-section and constituting a support for the bottom of the boat, the legs of the U-section portion projecting forwardly from its point of attachment to the L-section in spaced relation above the horizontal portions of the latter and terminating at their front ends in downwardly-facing extensions in intersecting relation to the corresponding free ends of the horizontal portions of the L-section and jointly serving therewith as supports for an axle, and means at the converging upper ends of said L-section for detachable clamping engagement with the back of the boat.

FREDERICK T. NEWELL.

REFERENCES CITED

The following references are of record in the file of this patent:

UNITED STATES PATENTS

| Number | Name | Date |
|---|---|---|
| 748,770 | Montgomery | Jan. 5, 1904 |
| 813,587 | Riek | Feb. 27, 1906 |
| 1,109,520 | Flower | Sept. 1, 1914 |
| 1,374,372 | Freund | Apr. 12, 1921 |
| 1,691,633 | Bertram | Nov. 13, 1928 |
| 1,779,887 | Melanson | Oct. 28, 1930 |
| 2,040,339 | Ross | May 12, 1936 |
| 2,171,889 | Payson | Sept. 5, 1939 |
| 2,219,254 | Davis | Oct. 22, 1940 |
| 2,277,302 | Chenette | Mar. 24, 1942 |
| 2,424,641 | Swanson | July 29, 1947 |